Patented Sept. 3, 1929.

1,726,713

UNITED STATES PATENT OFFICE.

CLAYTON OLIN NORTH, OF TALLMADGE TOWNSHIP, AND CHESTER WILLIAM CHRISTENSEN, OF AKRON, OHIO, ASSIGNORS TO THE RUBBER SERVICE LABORATORIES CO., OF AKRON, OHIO, A CORPORATION OF OHIO.

ART OF VULCANIZING RUBBER.

No Drawing.   Application filed May 19, 1924.  Serial No. 714,468.

Our invention is directed to the art of accelerating the vulcanization of rubber and is particularly directed to the use of certain types of compounds produced by the interaction of unsaturated aldehydes upon amines as accelerators of vulcanization as is hereinafter set forth.

More particularly our invention is directed to the use as accelerators of the vulcanization process of compounds prepared by the interaction of an additional quantity of an unsaturated aldehyde upon the type of compounds prepared as described in our Patent No. 1,670,312, granted May 22, 1928. According to the disclosure of this patent, we have found that valuable accelerators of the vulcanization of rubber may be obtained by the interaction of equi-molecular quantities of any primary aromatic amine with an unsaturated straight chain aldehyde containing preferably not more than seven and not less than three carbon atoms. These simple reaction products so produced may be reacted with an additional quantity of the same or a different aldehyde and preferably with an unsaturated aldehyde to produce other compounds of complex chemical composition which we have found to be particularly valuable when used as vulcanization accelerators in the manner as hereinafter set forth. Our compounds may, then, be described as, the aldehyde derivatives of Schiff's bases wherein either or both of the aldehydes used are unsaturated.

This new type of compounds, that is, the aldehyde reaction products of the condensation products of unsaturated straight chain aldehydes with primary aromatic amines may be most readily prepared by heating together over the water or steam bath a mixture of a primary aromatic amine with a greater quantity of the aldehyde than is required to produce a simple condensation product. Thus, for example, aniline and croton-aldehyde may be mixed in the proportion of 93 parts of aniline and more than 70 parts of the aldehyde and the mixture heated over a boiling water bath and maintained at that temperature for a period of time (about three hours) until it is certain that the reaction is completed, whereupon the water of condensation formed in the reaction is more or less completely removed by evaporation and the product is further heated at a temperature no higher than 110° centigrade until the material is practically or completely freed of water. The material may also be produced in a two stage process, if desired, as is shown by the following example.

An amine, such as aniline and an unsaturated aldehyde such as croton-aldehyde may be heated together in equi-molecular proportions (that is, 93 parts of the aniline and 70 parts of the croton-aldehyde). The mixture is heated over the boiling water bath as before for a period of some hours, whereby a simple condensation product is formed. Before or subsequent to the removal of water of condensation, a further quantity of the same or a different aldehyde is added to the mixture and the heating continued under the same conditions as before. Further condensation takes place and there is formed the aldehyde reaction product of an unsaturated aldehyde and an amine. The water present in the mixture is now more or less completely removed by careful heat treatment of the product at a temperature no higher than 110° centigrade, whereupon the comparatively solid product obtained is ready for incorporation into a rubber mix.

It is evident to those skilled in the art that other methods may be used in preparing my preferred class of compounds without departing from the spirit of the invention. Other amines and aldehydes than those cited in the examples given may also be used. Thus, for example, we may combine any primary aromatic amine, such as aniline, a toluidine, a xylidene, naphthylamine, aminocymene and the like with equal molecular proportions of any unsaturated aldehyde such as acrolein, croton-aldehyde, guaiacol, methyl-ethyl-acrolein, propargylic aldehyde and the like and then further react the product obtained with an additional quantity of the same or a different unsaturated aldehyde or with an excess of a saturated aldehyde such as formaldehyde, acetaldehyde, the polymeric aldehydes such as paraldehyde, or other aldehydes of the aliphatic series of organic compounds. Furthermore it is possible to prepare a simple condensation product of an amine with an unsaturated aldehyde and then to use an excess of a different aldehyde or even an aldehyde fully saturated as regards the hydrocarbon nucleus to prepare the secondary compound. Thus, we may react equi-molecular quantities of o-toluidine or other primary aromatic amine with croton-aldehyde, acrolein or other unsaturated aldehyde and then react the product so formed with an excess of formaldehyde, acetaldehyde or other straight chain aliphatic aldehydes. As another instance of the possible compounds we may use in our process, we mention the product obtained by the action of formaldehyde or acetaldehyde on the reaction product of acrolein and an aromatic primary amine.

Whatever the method used in preparing the compounds of the type set forth wherein an aromatic primary amine has been reacted with an excess of a straight chain unsaturated aldehyde the method of using these compounds as accelerators of the vulcanization of rubber is the same. Thus, for example, 100 parts of smoked sheet rubber, 3.5 parts of sulfur, 5 parts of zinc oxide and 1 part of accelerator are milled together in the well known manner on the differential mixing mills. This mix is then heat treated in the vulcanization press under a steam pressure of 40 pounds per square inch for about twenty minutes and a good vulcanized product results. The composition prepared as just described comprises a basis for a friction and coat stock. The vulcanized product possesses good low temperature characteristics and gives a product possessing a good technical cure. The lowest undercure of technical value for the stock described above is obtained by vulcanizing for about ten minutes at 20 pounds steam pressure per square inch. For a friction stock for use in a large pneumatic tire there is needed a composition that cures rapidly at low temperatures. Since the composition described gives a product when vulcanized at 20 pounds steam pressure per square inch which possesses the required characteristics and properties, this stock prepared as shown in the above example and by the use of our preferred class of accelerators comprises an excellent friction stock.

Another example illustrative of the use of our new class of accelerators is in the manufacture of a rubber stock which may be used in the carcass of a rubber tire, for example, in a cover stock which is placed on top of the breaker strip of a pneumatic tire. For the preparation of a mixture intended for this purpose, we may mill together a mixture of 100 parts of smoked sheet rubber, 4 parts of sulfur, 40 parts of zinc oxide and 1 part of our new type of accelerator, for example, the product produced by the action of croton-aldehyde on the condensation product of croton-aldehyde and aniline. This mixture is then vulcanized for about 20 minutes in a vulcanizing press under 40 pounds steam pressure per square inch whereupon the resulting vulcanized product is found to possess a tensile strength in excess of 3000 pounds per square inch. The ultimate elongation is about 800%, while the load necessary to produce 300% elongation is about 300 pounds per square inch.

Our new class of accelerators may be used for the manufacture of other types of compounds, such as a hard rubber. Illustrative of another rubber compound prepared by the use of our new accelerators, we may mention the following which represents a typical tread stock. We mill together in the well known manner 53 parts of smoked sheet rubber, 19 parts of carbon black, 20½ parts of zinc oxide, 2 parts of sulfur, 1 part of any of our new class of accelerators, 1 part of hardwood pitch ("Fluxol"), 1 part of a blended oil ("Cycline") and 3 parts of mineral rubber. This mixture after vulcanization for about one hour at 40 pounds steam pressure per square inch, yields a product possessing a tensile strength of approximately 4000 pounds per square inch, having an ultimate elongation of approximately 700% while the load necessary to cause an elongation of 300% is approximately 1000 pounds per square inch.

Although we have set forth the preferred methods whereby our accelerators of vulcanization may be prepared and have described several examples illustrative of the manner of using the products so formed, it is to be understood that these descriptions are illustrative only and do not constitute the sole methods of producing vulcanized rubber compounds by means of our new class of vulcanization accelerators. Other methods of using our new compounds as accelerators in the manufacture of vulcanized rubber are apparent to those skilled in the art and it is our intention to include all such methods, as well as those set forth in the foregoing examples, as falling within the scope of our invention and as covered by the claims appended hereto. Furthermore, it is to be understood that our invention is not limited by the accuracy of any theories advanced in explanation of the various phases of our invention but that the invention is limited solely by the following claims in which we intend to define and claim our invention as broadly as is permissible in view of the prior art.

What we claim is:

1. The process which consists in incorporating a small percentage of the aldehyde reaction product of the condensation product of an aromatic primary amine and an unsaturated aliphatic aldehyde containing less than eight carbon atoms into a rubber mixture and heating with a vulcanizing agent.

2. The process which consists in incorporating a small percentage of the aldehyde reaction product of the condensation product of an aromatic primary amine and an unsaturated aliphatic aldehyde containing more than two and less than eight carbon atoms into a rubber mixture and heating with a vulcanizing agent.

3. The process which consists in corporating a small percentage of the aldehyde reaction product of the product obtained by reacting together aniline and croton-aldehyde into a rubber mix and heating with a vulcanizing agent.

4. The process which consists in incorporating a small percentage of the reaction product obtained by reacting croton-aldehyde on the condensation product of aniline and croton-aldehyde into a rubber mixture and heating with a vulcanizing agent.

5. The process which consists in incorporating a small percentage of the product obtained by reacting aniline with more than an equal molecular proportion of croton-aldehyde into a rubber mixture and heating with a vulcanizing agent.

6. The process which consists in incorporating a small percentage of the product obtained by reacting aniline with an excess of croton-aldehyde into a rubber mixture and heating with a vulcanizing agent.

7. The process which consists in incorporating into a rubber mixture a small percentage of the product obtained by reacting with an aldehyde, a Schiff's base prepared by reacting an aromatic primary amine with an unsaturated aldehyde containing from three to seven carbon atoms and heating the mixture so formed with a vulcanizing agent.

8. The process which consists in incorporating a small percentage of the croton-aldehyde reaction product of a Schiff's base prepared by reacting a primary aromatic amine with an unsaturated aliphatic aldehyde into a rubber mixture and heating with a vulcanizing agent.

9. A rubber product derived from rubber, combined with the aldehyde derivative of the reaction product of a primary aromatic amine and an unsaturated aliphatic aldehyde containing from three to seven carbon atoms and vulcanized.

10. A rubber product derived from rubber, combined with the aldehyde derivative of the condensation product of aniline and croton-aldehyde, and vulcanized.

11. The process of manufacturing an accelerator for use in vulcanizing rubber comprising reacting with additional aldehyde the condensation product of an unsaturated aliphatic aldehyde having more than two and less than eight carbon atoms and a primary aromatic amine.

12. The process of manufacturing an accelerator for use in vulcanizing rubber comprising reacting with additional aldehyde the condensation product of croton-aldehyde and aniline.

13. The process of manufacturing an accelerator for use in vulcanizing rubber comprising reacting with croton-aldehyde the condensation product of croton-aldehdye and aniline.

14. A rubber product derived from rubber, combined with the aldehyde reaction product of the condensation product of an aromatic primary amine and an unsaturated aliphatic aldehyde containing more than two and less than eight carbon atoms and vulcanized.

CLAYTON OLIN NORTH.
CHESTER WILLIAM CHRISTENSEN.